(12) United States Patent
Yao et al.

(10) Patent No.: US 8,669,308 B2
(45) Date of Patent: Mar. 11, 2014

(54) RESIN COMPOSITION AND RESIN MOLDED PRODUCT

(75) Inventors: Kenji Yao, Kanagawa (JP); Manabu Kawashima, Kangawa (JP); Masato Mikami, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/595,342

(22) Filed: Aug. 27, 2012

(65) Prior Publication Data

US 2013/0253108 A1    Sep. 26, 2013

(30) Foreign Application Priority Data

Mar. 23, 2012 (JP) ................................. 2012-068291

(51) Int. Cl.
*C08K 5/523* (2006.01)
(52) U.S. Cl.
USPC .......................................... 524/127; 524/494
(58) Field of Classification Search
USPC ................................. 524/127, 494
See application file for complete search history.

(56) References Cited

U.S. PATENT DOCUMENTS

| | | | | |
|---|---|---|---|---|
| 2008/0048365 A1* | 2/2008 | Yao | .......................... | 264/328.17 |
| 2008/0051507 A1* | 2/2008 | Yao | .............................. | 524/599 |
| 2008/0125544 A1* | 5/2008 | Yao | .............................. | 525/54.4 |
| 2010/0292381 A1* | 11/2010 | Kamikawa | ..................... | 524/394 |
| 2012/0004363 A1* | 1/2012 | Urushihara et al. | .......... | 524/602 |
| 2012/0204755 A1* | 8/2012 | Yao | ............................. | 106/18.11 |

FOREIGN PATENT DOCUMENTS

| | | |
|---|---|---|
| EP | 2 371 902 A1 | 10/2011 |
| JP | A-2008-274068 | 11/2008 |

OTHER PUBLICATIONS

Jun. 13, 2013 European Search Report issued in EP12188426.6.

* cited by examiner

*Primary Examiner* — Peter Szekely
(74) *Attorney, Agent, or Firm* — Oliff PLC

(57) ABSTRACT

There is provided a resin composition including: a crosslinked polymer compound having a crosslinked structure formed by reaction of a carboxyl group of aliphatic polyester having at least a carboxyl group at an end of polymer chain with a hydroxyl group of a lignophenol derivative having at least a hydroxyl group, a glass fiber, and condensed phosphate ester.

19 Claims, 1 Drawing Sheet

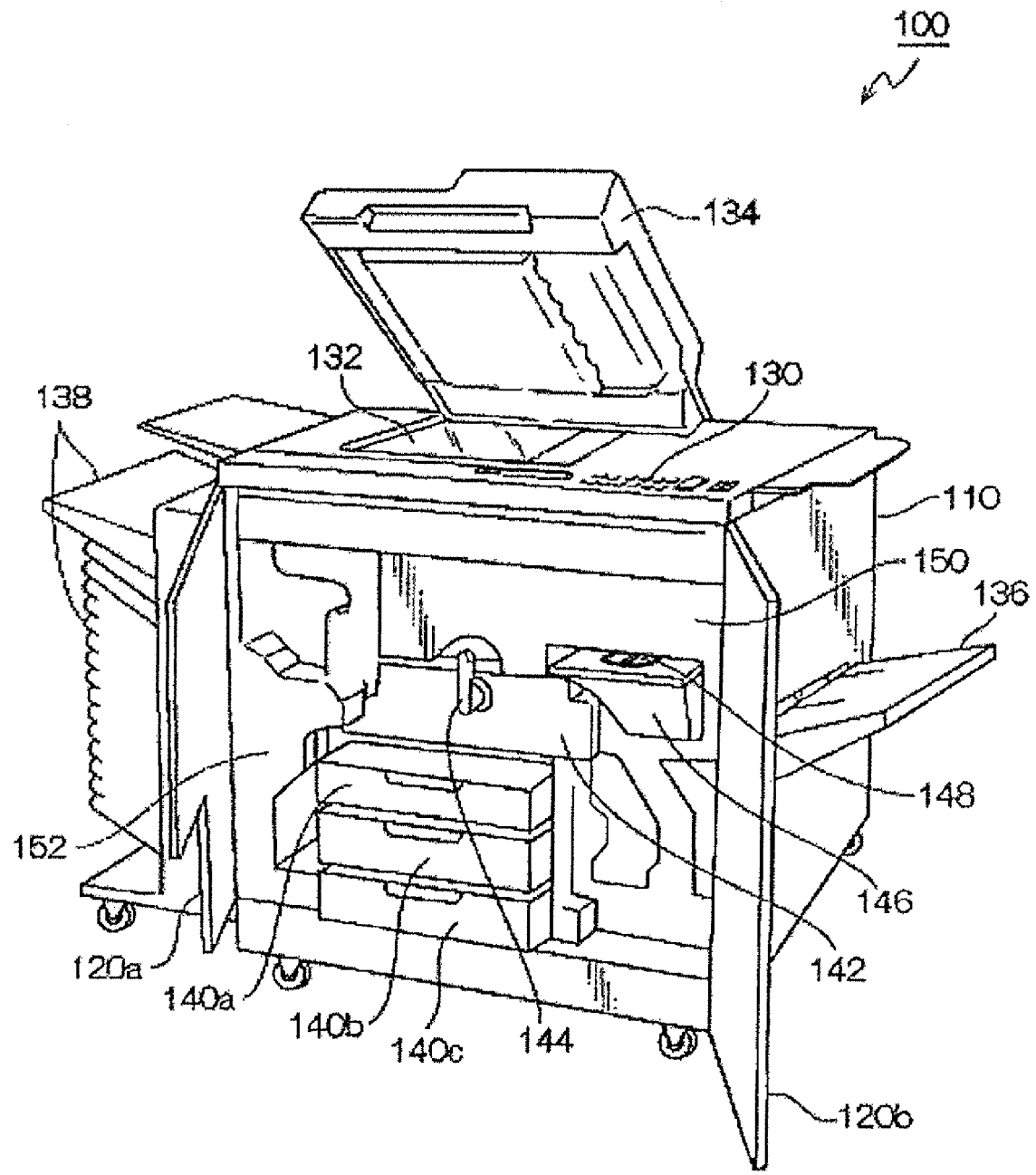

RESIN COMPOSITION AND RESIN MOLDED PRODUCT

CROSS-REFERENCE TO RELATED APPLICATION(S)

This application is based on and claims priority under 35 U.S.C. 119 from Japanese Patent Application No. 2012-068291 filed on Mar. 23, 2012.

BACKGROUND

1. Field

The present invention relates to a resin composition and a resin molded product.

2. Description of the Related Art

From the viewpoint of reducing environmental load, lignophenol derivatives obtained from plants are a material which draws attention as one of candidates of non-petroleum-based resin materials.

For a resin composition using the lignophenol derivative, it is disclosed, for example, in Japanese Patent Application Laid-Open No. 2008-274068 that the resin composition is a lignophenol-polylactic acid composite having at least three-branched-chains formed from a polylactic acid in a molecule, and the lignophenol-polylactic acid composite is obtained by a process of ring-opening polymerization of lactide by using lignophenol having at least three hydroxyl groups in a molecule as an initiator.

SUMMARY (1) A resin composition including: a crosslinked polymer compound having a crosslinked structure formed by reaction of a carboxyl group of aliphatic polyester having at least a carboxyl group at an end of polymer chain with a hydroxyl group of a lignophenol derivative having at least a hydroxyl group, a glass fiber, and condensed phosphate ester.

BRIEF DESCRIPTION OF DRAWINGS

Exemplary embodiments of the present invention will be described in detail based on the following FIGURE, wherein:

FIG. 1 is a schematic view illustrating an example of parts of an electronic and electric device including a molded product according to the exemplary embodiment.

DETAILED DESCRIPTION OF EXEMPLARY EMBODIMENTS

Hereinafter, a resin composition and a resin molded product according to the exemplary embodiment will be described in detail.

[Resin Composition]

A resin composition according to the exemplary embodiment includes a crosslinked polymer compound having a crosslinked structure formed by reaction of a carboxyl group in aliphatic polyester having at least a carboxyl group at an end of a polymer chain with a hydroxyl group of a lignophenol derivative having at least a hydroxyl group in a molecular structure, a glass fiber, and condensed phosphate ester.

When a V combustion test suitable for UL-94 is preformed on aliphatic polyester, a serious drip (dripping when melting) occurs, such that flame retardancy is evaluated as a V-Not level, that is, flame retardancy cannot be achieved. When a phosphorus compound is added as a flame retardant to aliphatic polyester, flame retardancy, although varying depending on a kind or an amount of the phosphorus compound added, is improved to a V-2 level due to a flame quenching effect and a drip acceleration effect. However, as the drip is accelerated as described above, it is difficult to achieve excellent flame retardancy of V-0 level when using aliphatic polyester.

Further, from the viewpoint of improving mechanical strength or heat resistance, glass fibers are added to aliphatic polyester, but in this case, a candle effect occurs in which glass fibers act like a wick to transmit flames, thereby accelerating combustion.

In contrast, excellent flame retardancy is achieved with the resin composition according to the exemplary embodiment which is obtained by using a crosslinked polymer compound formed by reaction of the carboxyl group at the end of the polymer chain of aliphatic polyester with the hydroxyl group of the lignophenol derivative, a glass fiber, and condensed phosphate ester in combination.

The reason for this effect is not clear, but is thought to be as follows. First, the hydroxyl group, the carboxyl group or other functional groups present in the lignophenol derivative is reacted with the carboxyl group or the hydroxyl group at the end of the polymer chain of aliphatic polyester, to form a crosslinked structure of aliphatic polyester. It is inferred that some portions of the condensed phosphate ester as a flame retardant are coordinated with functional groups of the lignophenol derivative, and besides, are dispersed in a free volume in the crosslinked structure of the crosslinked polymer compound, and thus, very high dispersibility may be obtained. As a result, the drip effect of aliphatic polyester is suppressed and the flame quenching effect is accelerated.

In the case where the glass fiber does not reach the level at which the flame quenching effect is exhibited, flame retardancy deteriorates due to the candle effect as described above, but it is considered that the candle effect can be suppressed, because the flame quenching effect improved by dispersion of condensed phosphate ester makes it possible for flames to be extinguished faster than to be transmitted along the glass fibers. Further, it is assumed that the glass fibers carry out a role as a frame of the resin composition to obtain an effect of suppressing the drip effect caused by aliphatic polyester, and accordingly, excellent flame retardancy is achieved.

(Crosslinked Polymer Compound)

—Lignophenol Derivative—

The lignophenol derivative used in the exemplary embodiment will be described.

The lignophenol derivative includes at least a hydroxyl group in its molecular structure, to be crosslinked with a carboxyl group in aliphatic polyester. The lignophenol derivative is a polymer, and the polymer has a plurality of hydroxyl groups.

The lignophenol derivative used in the exemplary embodiment is not particularly limited, but preferably has a structure represented by the following general formula (1).

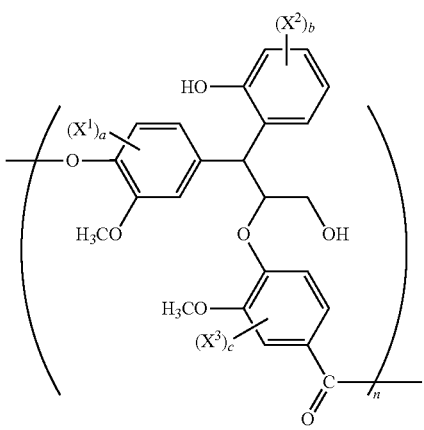

(1)

In general formula (1), each of $X^1$, $X^2$ and $X^3$ independently represents a substituted or unsubstituted alkyl group, a substituted or unsubstituted alkoxy group, a substituted or unsubstituted aryl group, a substituted or unsubstituted arylene group, a hydroxyl group, a carboxyl group, an amino group or an amide group.

When each of $X^1$, $X^2$ and $X^3$ is a substituted alkyl group, a substituted alkoxy group, a substituted aryl group or a substituted arylene group, examples of a substituent thereof include a hydroxyl group, a carboxylic acid group, a carboxylic acid derivative group, an alkyl group, an alkoxy group and the like.

In general formula (1), each of a and c independently represents an integer of from 0 to 3, b represents an integer of from 0 to 4, and n represents an integer of from 5 to 20.

More preferred examples of the lignophenol derivative represented by general formula (1) include a lignophenol derivative represented by the following general formula (2) to general formula (4).

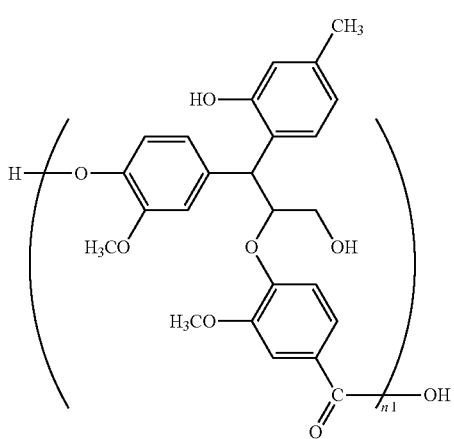

(2)

In general formula (2), n1 represents an integer of from 5 to 20.

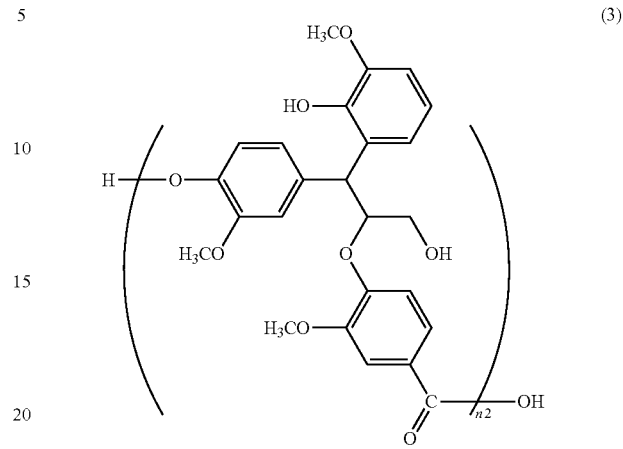

(3)

In general formula (3), n2 represents an integer of from 5 to 20.

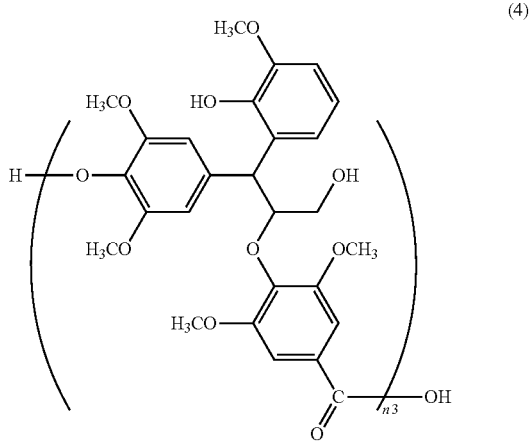

(4)

In general formula (4), n3 represents an integer of from 5 to 20.

The lignophenol derivative represented by general formula (1) may be a single structure, or may be a mixture of two or more kinds of different structures. Meanwhile, the lignophenol derivative represented by general formula (1) is a polymer mixture, and n in general formula (1) means an average value of n with respect to the total polymer mixture.

Meanwhile, the lignophenol derivative used in the exemplary embodiment has a weight average molecular weight (Mw) of preferably from 3,000 to 6,000, and more preferably from 3,500 to 5,000.

The molecular weight distribution (Mw/Mn) is preferably from 3 to 10, and more preferably from 5 to 8. The melting temperature is preferably from 150° C. to 180° C.

The weight average molecular weight is measured by gel permeation chromatography (GPC). The molecular weight measurement by GPC is performed with a chloroform solvent using HLC-8320 GPC manufactured by Tosoh Corporation as a measuring apparatus and a column TSKgel GMHHR-M+TSKgel GMHHR-M (7.8 mm I.D. 30 cm) manufactured by Tosoh Corporation. The weight average molecular weight is calculated by using a molecular weight calibration curve that is prepared from the measurement results by a monodispersed polystyrene standard sample.

—Synthesis Method of Lignophenol Derivative—

Examples of a synthesis method of a lignophenol derivative according the exemplary embodiment include a method, including: converting and separating lignin contained in plant resources such as cypress or cedar into a lignophenol derivative to be extracted, hydrolyzing an end thereof by water addition, and subjecting the end to carboxylation by an oxidation reaction using natural ketone. The structure of the lignophenol derivative obtained by such a preparation method may vary according to a difference in plant resources such as needle-leaved trees and broad-leaved trees, but there is no problem with characteristics thereof.

For an example of synthesis methods of a lignophenol derivative, a lignophenol derivative may be obtained by first converting lignin contained in plant resources into a lignophenol derivative to separate as a precipitate, washing with water, and subsequently, dissolving the washed precipitate in acetone, adding the resulting solution dropwise to a diethyl ether layer, and subjecting to re-precipitation.

Meanwhile, the weight average molecular weight or the molecular weight distribution (Mw/Mn) of the lignophenol derivative is adjusted by adjusting the repeating number of the processes of the dissolution and re-precipitation.

When the lignophenol derivative used in the exemplary embodiment has a structural unit different from the structural unit represented by general formula (1), the different structural unit may include a polyester structure such as an aliphatic polyester structure, a polycarbonate structure, an aromatic polyester structure, a polyimide structure, a polyolefin structure such as polypropylene and polyethylene, a polystyrene structure, a polyacrylate structure, a polybutadiene structure, a copolymer structure thereof and the like, and among them, an aliphatic polyester structure is preferred. In this case, the polymer may be any one of a block copolymer or a random copolymer.

In the lignophenol derivative used in the exemplary embodiment, the ratio of the structural unit represented by general formula (1) based on the total structural unit is preferably from 5% by mol to 100% by mol, and more preferably from 10% by mol to 100% by mol.

—Aliphatic Polyesters—

Subsequently, the aliphatic polyester used in the exemplary embodiment will be described.

The aliphatic polyester is not particularly limited, but examples thereof include hydroxycarboxylic acid polymers, a polycondensate of aliphatic diol and aliphatic carboxylic acid and the like. In the end of a polymer chain (end of a main chain), both ends may be carboxyl groups, or only one end may be a carboxyl group and the other end may be a different group (for example, a hydroxyl group). However, it is more preferred that both ends are carboxyl groups.

Specific examples of the aliphatic polyester include polylactic acid, poly-3-hydroxybutyrate, polyhydroxyhexanate, polyhydroxyvalerate, a copolymer thereof and the like, and polybutylene succinate, polybutylene adipate, polyethylene succinate, polyethylene adipate, a copolymer of two or more kinds thereofs and the like.

The aliphatic polyester may be used either alone or in combination of two or more kinds.

As the aliphatic polyester, for example, a single continuous body (for example, polyhydroxybutyrate) may be used, optical isomers, such as L- and D-isomers of polylactic acid, may be intermixed, or a copolymer thereof may be used.

Among them, as aliphatic polyester, polylactic acid, polyhydroxybutyrate, polybutylene succinate and a copolymer of two or more kinds thereof are preferred, and polylactic acid is more preferred.

Polylactic Acid

The polylactic acid is not particularly limited as long as the acid has at least a carboxyl group at an end of a polymer chain (that is, an end of a main chain), and may be an L-lactic acid, a D-lactic acid, or a mixture thereof (for example, a stereo complex with poly-L-lactic acid and poly-D-lactic acid mixed, or a polylactic acid including both an L-lactic acid block and a D-lactic acid block in its structure).

The polylactic acid as a kind of the aliphatic polyester is a resin having a structural unit represented by the following structural formula (1).

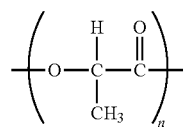

Structural Formula (1)

Molecular Weight

As the aliphatic polyester used in the exemplary embodiment, aliphatic polyesters having various molecular weights may be used. The weight average molecular weight of the aliphatic polyester is preferably from 3,000 to 200,000, and more preferably from 5,000 to 150,000.

Meanwhile, the weight average molecular weight is measured by gel permeation chromatograph (GPC). The molecular weight measurement by GPC is performed by a chloroform solvent using HLC-8320 GPC manufactured by Tosoh Corporation as a measuring apparatus and a column TSKgel GMHHR-M+TSKgel GMHHR-M (7.8 mm I.D. 30 cm) manufactured by Tosoh Corporation. The weight average molecular weight is calculated by using a molecular weight correction curve that is prepared from the measurement results by a monodispersed polystyrene standard sample.

—Synthesis of Crosslinked Polymer Compound—

The crosslinked polymer compound according to the exemplary embodiment is obtained by mixing the aliphatic polyester and the lignophenol derivative, and melt-kneading the mixture to achieve crosslinking polymerization.

A known means is used as a means for mixing or melt-kneading, and examples thereof include a twin-screw extruder, a Henschel mixer, a Banbury mixer, a single screw extruder, a multi screw extruder, a co-kneader and the like.

When aliphatic polyester and a lignophenol derivative are subjected to crosslinking polymerization, a crosslinking catalyst may be added thereto.

Examples of the crosslinking catalyst used in the exemplary embodiment include tetrabutoxy titanic acid, germanium oxide, stannous octoate, magnesium oxide, calcium acetate, manganese acetate, cobalt acetate and the like.

The amount of the crosslinking catalyst added is preferably from $1 \times 10^{-4}$% by mass to 1% by mass and more preferably from $1 \times 10^{-3}$% by mass to 0.5% by mass, based on the total amount of the aliphatic polyester and the lignophenol derivative.

Ratio of the aliphatic polyester and the lignophenol derivative

In the crosslinked polymer compound according to the exemplary embodiment, the mass ratio (L/E×100) of the content (E) of a component derived from aliphatic polyester and the content (L) of a component derived from the lignophenol derivative is adjusted by amounts of aliphatic polyester and the lignophenol derivative used in the crosslinking polymerization. Meanwhile, portions bound by polycondensation are calculated by including carboxylic acid oxygen atoms in an aliphatic polyester structure.

The mass ratio (L/E×100) is preferably from 0.1% by mass to 1% by mass, and more preferably from 0.2% by mass to 0.5% by mass.

When the mass ratio is 0.1% by mass or more, the drip is prevented and flame retardancy is improved by crosslinking, and the mechanical strength is also improved. Meanwhile, when the mass ratio is 1% by mass or less, the polymer compound is not excessively crosslinked, and thus, is suppressed from becoming hard and brittle, thereby obtaining excellent mechanical strength.

In order to calculate the mass ratio (L/N×100) from the crosslinked polymer compound according to the exemplary embodiment or a resin molded product formed by using the crosslinked polymer compound, the following method is used. By the measurement of the proton nuclear magnetic resonance ($^1$H-NMR) spectrum, the amount of protons derived from the aliphatic polyester and the amount of protons directly bonded to the benzene ring derived from the lignophenol derivative are obtained respectively, and the mass ratio (L/N×100) is calculated from the obtained values.

(Flame Retardant)

The resin composition according to the exemplary embodiment may also contain at least a condensed phosphate ester as a flame retardant.

Condensed Phosphate Ester

Examples of condensed phosphate ester include aromatic condensed phosphate esters such as bisphenol A type, biphenylene type and isophthal type, and specific examples thereof include condensed phosphate ester represented by the following general formula (I) or general formula (II).

In general formula (1), each of $Q^1$, $Q^2$, $Q^3$ and $Q^4$ independently represents an alkyl group having from 1 to 6 carbon atoms, each of $Q^5$ and $Q^6$ independently represents a methyl group, each of $Q^7$ and $Q^8$ independently represents a hydrogen atom or a methyl group, each of m1, m2, m3 and m4 independently represents an integer of from 0 to 3, each of m5 and m6 independently represents an integer of from 0 to 2, and n1 represents an integer of from 0 to 10.

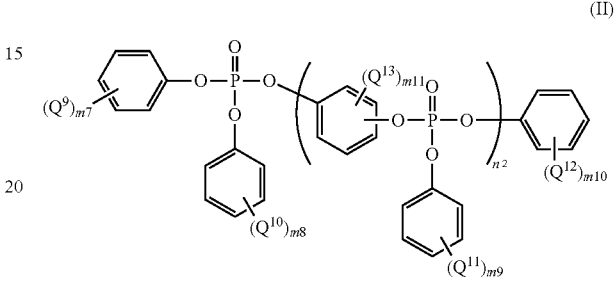

(II)

In general formula (II), each of $Q^9$, $Q^{10}$, $Q^{11}$ and $Q^{12}$ independently represents a an alkyl group having from 1 to 6 carbon atoms, $Q^{13}$ represents a methyl group, each of m7, m8, m9 and m10 independently represents an integer of from 0 to 3, m11 represents an integer of from 0 to 4, and n2 represents an integer of from 0 to 10.

The condensed phosphate ester may be a synthetic product or a commercially available product. Specific examples of the commercially available product of condensed phosphate ester include commercially available products ("PX200", "PX201", "PX202", "CR741" and the like) manufactured by DAIHACHI CHEMICAL INDUSTRY CO., LTD., commercially available products ("Adekastab FP2100", "FP2200" and the like) manufactured by ADEKA CORPORATION and the like.

Among them, the condensed phosphate ester may be at least one of a compound represented by the following structural formula (1) (for example, "PX200" manufactured by DAIHACHI CHEMICAL INDUSTRY CO., LTD.) and a compound represented by the following structural formula (2) (for example, "CR741" manufactured by DAIHACHI CHEMICAL INDUSTRY CO., LTD.).

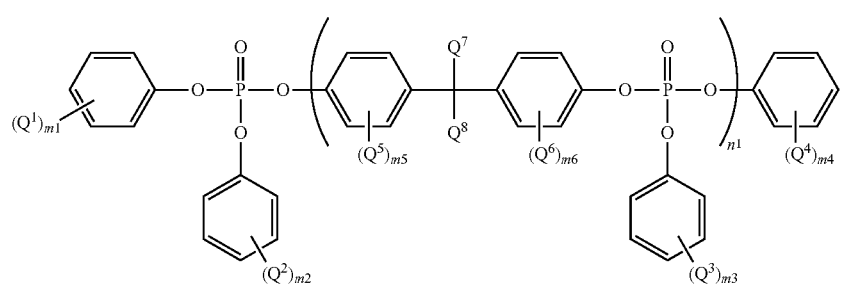

(I)

Structural Formula (1)

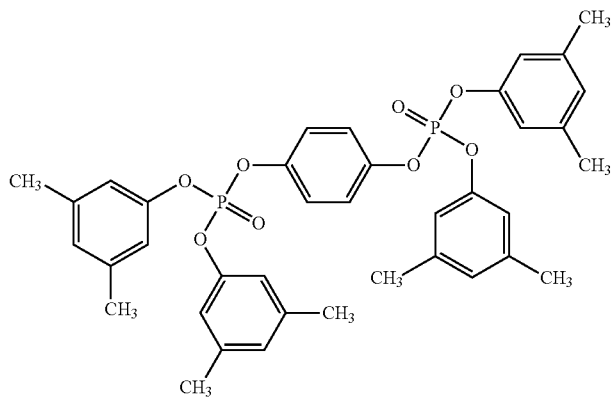

Structural Formula (2)

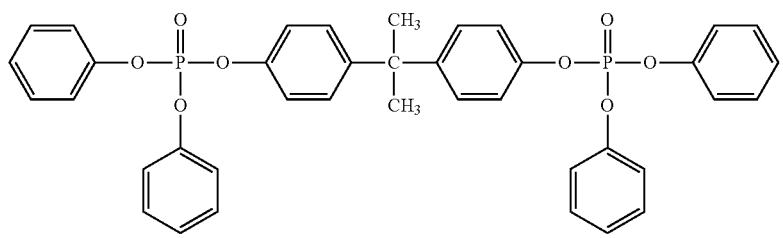

The content of condensed phosphate ester is preferably from 5% by mass to 30% by mass, and more preferably from 10% by mass to 15% by mass, based on the total amount of the resin composition.

The content of condensed phosphate ester is preferably from 20 parts by mass to 300 parts by mass, and more preferably from 220 parts by mass to 280 parts by mass, based on 1 part by mass of the lignophenol derivative.

Aluminum Hydroxide

In the exemplary embodiment, it is more preferred to use aluminum hydroxide in combination as a flame retardant. By using the aluminum hydroxide in combination, excellent flame retardancy is achieved.

The reason for this effect is not clear, but is thought to be as follows. With temperatures rising as flames approach, aluminum hydroxide depolymerizes aliphatic polyester, and thus, a thermal decomposition temperature of the crosslinked aliphatic polyester is lowered. Therefore, it is deemed that excellent flame retardancy can be obtained by setting the thermal decomposition temperature of condensed phosphate ester to be in the same range as the thermal decomposition temperature of the crosslinked aliphatic polyester.

The content of aluminum hydroxide which is added to condensed phosphate ester to be used in combination is preferably from 5% by mass to 30% by mass, and more preferably from 7% by mass to 20% by mass, based on the total amount of the resin composition. It is more preferred that a mass ratio of aluminum hydroxide to the condensed phosphate ester is from 6:1 to 1:1, and in such a case, excellent flame retardancy can be obtained.

Other Flame Retardants

Other flame retardants may be used in combination. Examples of the flame retardants may include bromine-based flame retardants, nitrogen-based flame retardants, phosphorus-based flame retardants, silicone-based flame retardants, inorganic particle-based flame retardants and the like. Preferred examples of the flame retardant include nitrogen-based flame retardants such as melamine sulfate, phosphorus-based flame retardants such as phosphate esters, condensed phosphate ester-based and phosphorus polymerized polyester-based flame retardants, silicone-based flame retardants such as silicone powder and silicone resin, inorganic particle-based flame retardants such as magnesium hydroxide and the like.

The content of other flame retardants is preferably from 0% by mass to 10% by mass, and more preferably from 0% by mass to 5% by mass, based on condensed phosphate ester.

(Glass Fiber)

The glass fiber is not particularly limited, and a known material is used as a glass fiber.

The fiber length of the glass fiber is preferably from 0.1 mm to 6 mm, and more preferably from 0.5 mm to 4 mm.

The diameter of the fiber is preferably from 5 μm to 20 μm and more preferably from 7 μm to 15 μm.

The aspect ratio is preferably from 10 to 300, and more preferably from 20 to 200.

The fiber length, the fiber diameter and the aspect ratio of the glass fiber are measured by performing image analysis using a needle type particle measuring instrument (manufactured by NIRECO Co., Ltd.).

From the viewpoint of adhesion properties between the glass fiber and aliphatic polyester, it is more preferred that the glass fiber is subjected to surface treatment. Examples of the surface treatment material may include a silane-based material, low molecular weight polylactic acid or the like.

A commercially available product may be used as a glass fiber, and examples thereof include PF-E-301-S#5, PF-E-001-S#5, PF-E-001-S and CS3J-332-S manufactured by Nittobo, Co., Ltd., ECS03-615, ESC03-631 K, ECS03-168, ECS03-650 and ECS03-350 manufactured by Central Glass, Co., Ltd. and the like.

The content of the glass fiber is preferably from 30 parts by mass to 200 parts by mass, further preferably from 40 parts by mass to 150 parts by mass, and more preferably from 50 parts by mass to 100 parts by mass based on 1 part by mass of the lignophenol derivative. The content of the glass fiber is preferably from 7% by mass to 30% by mass based on the total amount of the resin composition.

(Other Additives)

Resins other than aliphatic polyesters may be used.

Examples of resins include thermoplastic resins known in the related art, and specific examples thereof include a polycarbonate resin, a polypropylene resin, a polyamide resin, an aromatic polyester resin, a polyolefin resin, a polyester carbonate resin, a polyphenylene ether resin, a polyphenylene-sulfide resin, a polysulfone resin, a polyethersulfone resin, a polyarylene resin, a polyetherimide resin, a polyacetal resin, a polyvinyl acetal resin, a polyketone resin, a polyether ketone resin, a polyether ether ketone resin, a polyaryl ketone resin, a polyether nitrile resin, a liquid crystal resin, a polybenzimidazole resin, a polyparabanic acid resin, a vinyl-based polymer or copolymer resin that is obtained by polymerizing or copolymerizing at least one vinyl monomers selected from the group consisting of an aromatic alkenyl compound, a methacrylic acid ester, an acrylic acid ester and a cyanated vinyl compound, a diene-aromatic alkenyl compound copolymer resin, a vinyl cyanide-diene-aromatic alkenyl compound copolymer resin, an aromatic alkenyl compound-diene-vinyl cyanide-N-phenylmaleimide copolymer resin, a vinyl cyanide-(ethylene-diene-propylene (EPDM))-aromatic alkenyl compound copolymer resin, polyolefin, a vinyl chloride resin, a chlorinated vinyl chloride resin and the like.

These resins may be used either alone or in combination of two or more thereof.

Other additives may be added, and examples thereof include an antioxidant, a toughening agent, a compatibilizer, a weathering agent, a hydrolysis resistant agent and the like. Each of the contents of these additives is preferably 5% by mass or less based on the total amount of the resin composition.

[Molded Product]

The resin molded product according to the exemplary embodiment is configured by including the crosslinked polymer compound, the glass fiber and condensed phosphate ester.

Specifically, the molded product according to the exemplary embodiment is obtained, for example, by molding the resin composition according to the exemplary embodiment by a molding machine. Meanwhile, examples of the molding method by a molding machine include injection molding, extrusion molding, blow molding, hot press molding, calender molding, coating molding, cast molding, dipping molding, vacuum molding, transfer molding and the like.

Herein, the injection molding may be performed by using, for example, a commercially available apparatus such as NEX 150 manufactured by Nissei Plastic Industrial Co., Ltd., NEX 70000 manufactured by Nissei Plastic Industrial Co., Ltd., and SE50D manufactured by TOSHIBA MACHINE CO., LTD.

In this case, the cylinder temperature is preferably from 170° C. to 280° C., and more preferably from 180° C. to 270° C. The mold temperature is preferably from 40° C. to 110° C., and more preferably from 50° C. to 110° C.

The molded product according to the exemplary embodiment is suitably used in the use such as electronic and electric devices, home electric appliances, containers and automotive interior materials. More specific examples thereof include cases for home electric appliances, electronic and electric devices and the like, various parts and the like, wrapping films, storage cases for CD-ROM, DVD and the like, tableware, food trays, beverage bottles, chemical wrapping materials and the like, and among them, the molded product is appropriate for parts for electronic and electric devices.

FIG. 1 is an external perspective view of an image forming apparatus, which is an example of parts of an electronic and electric device provided with the molded product according to the exemplary embodiment, when viewed from the front side thereof.

An image forming apparatus 100 of FIG. 1 is provided with front covers 120a and 120b in front of a main product apparatus 110. These front covers 120a and 120b are configured to be freely opened and closed such that an operator may manipulate inner parts of the apparatus. Accordingly, the operator replenishes a toner when the toner is consumed, exchanges a consumed process cartridge, or removes clogged papers when jamming occurs in the apparatus. FIG. 1 illustrates the apparatus in a state where the front covers 120a and 120b are opened.

An operation panel 130 to which various conditions relating to image formation, such as a paper size or the number of copies are input by the operation of the operator, and a copy glass 132 on which an original copy to be read off is disposed are provided on the upper surface of the main product apparatus 110. The main product apparatus 110 is provided with, on the upper portion thereof, an automatic original copy conveying apparatus 134 that conveys the original copy on the copy glass 132. The main product apparatus 110 is provided with an image reading apparatus that obtains image data showing an image on the original copy by scanning the image on the original copy disposed on the copy glass 132. The image data obtained by the image reading apparatus are sent to an image forming unit through a control part. Meanwhile, the image reading apparatus and the control part are housed in a case 150 constituting a part of the main product apparatus 110. The image forming unit is provided in the case 150 as a freely detachable process cartridge 142. The process cartridge 142 may be detached and attached by turning an operation lever 144.

A toner storage part 146 is attached to the case 150 of the main product apparatus 110, and a toner is replenished from a toner supply port 148. The toner housed in the toner storage part 146 is supplied to a development apparatus.

Meanwhile, paper storage cassettes 140a, 140b and 140c are provided on the bottom part of the main product apparatus 110. A plurality of conveying rollers composed of a pair of rollers are arranged in the main product apparatus 110, and thus a conveying path is formed where papers in the paper storage cassettes are conveyed to the image forming unit located at the upper part thereof. Meanwhile, paper in each paper storage cassette is ejected one by one by a paper eject mechanism disposed at the end of the conveying path, and is sent out to the conveying path. A manual paper supply part 136 is provided at the side of the main product apparatus 110, and paper is also supplied therefrom.

The paper having an image formed thereon by the image forming unit is successively transported between two fixing rolls mutually in contact, supported by a case 152 constituting a part of the main product apparatus 110, and then paper-ejected to the outside of the main product apparatus 110. The main product apparatus 110 is provided with a plurality of paper discharge parts 138 at the opposite side of the side at which the paper supply part 136 is provided, and papers after image formation are discharged to these paper discharge parts.

In the image forming apparatus 100, the molded product according to the exemplary embodiment is used in, for example, the front covers 120a and 120b, an exterior of the process cartridge 142, the case 150 and the case 152.

EXAMPLE

Hereinafter, the present invention will be described in detail with reference to Examples, but the present invention is not limited thereto, "Parts" and "%" are on a mass basis unless otherwise specified.

<Preparation of Lignophenol Derivative>

(Lignophenol Derivative A)

1 kg of cypress wood flour is washed with 10 L of acetone in a 20-liter stirring autoclave and filtered, and the wood flour after completion of the washing is dried under conditions of 60° C./20 Pa for 4 hour by a vacuum dryer. The wood flour is placed into the 20-liter stirring autoclave and dissolved in 5 L of cresol, 5 L of 72% concentrated sulfuric acid is added thereto, and the mixture is stirred for 5 hour while cooling the autoclave such that the temperature is not increased. Only the cresol layer is extracted and concentrated until the volume reaches 500 ml, 1 L of diethyl ether is added thereto, the mixture is stirred, and then the solid content dispersed is filtered. This is dissolved in 5 L of acetone and the mixture is concentrated until the volume reaches 200 ml, the mixture is added dropwise to 5 L of distilled water to suction-filter the insolubles, and a process of "dissolution in acetone-concentration-dropwise addition into distilled water" is repeated five times again. In this way, lignophenol derivative A is obtained.

(Lignophenol Derivative B)

Lignophenol derivative B is obtained by the same manner as in the preparation method in lignophenol derivative A, except that the process of "dissolution in acetone-concentration-dropwise addition into distilled water" is repeated ten times.

(Lignophenol Derivative C)

Lignophenol derivative C is obtained by the same manner as in the preparation method in lignophenol derivative A, except that the process of "dissolution in acetone-concentration-dropwise addition into distilled water" is repeated twice.

(Lignophenol Derivative D)

Lignophenol derivative D is obtained by the same manner as in the preparation method in lignophenol derivative A, except that the process of "dissolution in acetone-concentration-dropwise addition into distilled water" is repeated thirty times.

(Lignophenol Derivative E)

Lignophenol derivative E is obtained by the same manner as in the preparation method in lignophenol derivative A, except that cedar wood flour is used instead of cypress wood flour as a raw material.

(Lignophenol Derivative F)

Lignophenol derivative F is obtained by the same manner as in the preparation method in lignophenol derivative B, except that cedar wood flour is used instead of cypress wood flour as a raw material.

The chemical structures of Lignophenol derivative A to F are shown below.

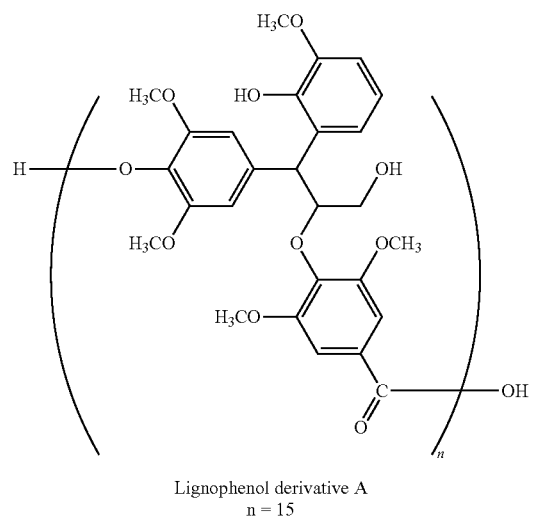

Lignophenol derivative A
n = 15

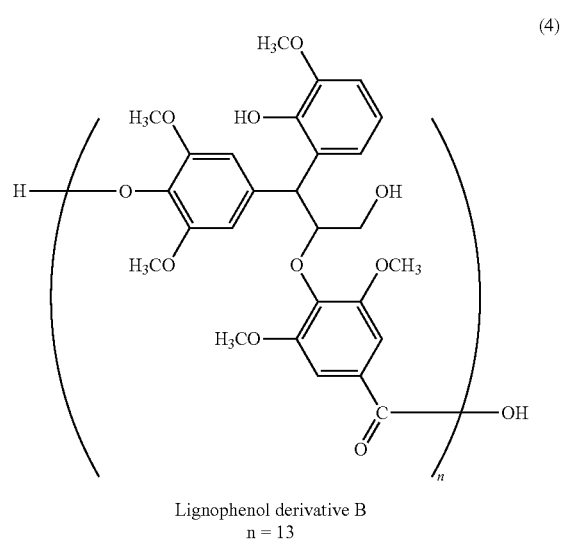

Lignophenol derivative B
n = 13

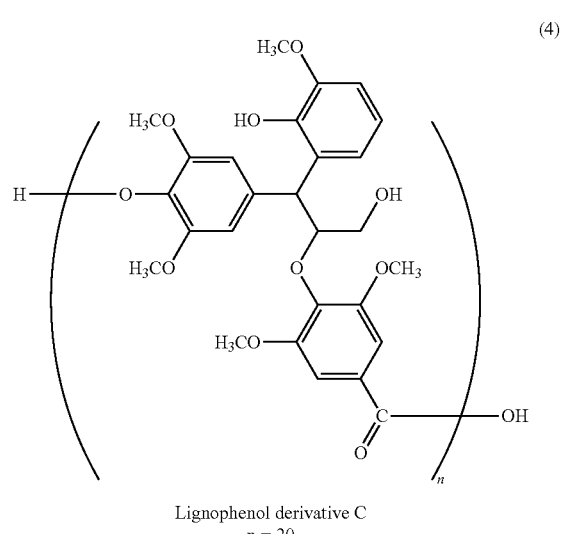

Lignophenol derivative C
n = 20

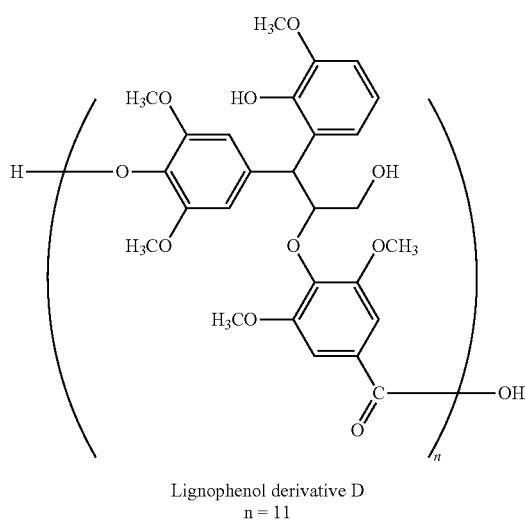

Lignophenol derivative D
n = 11

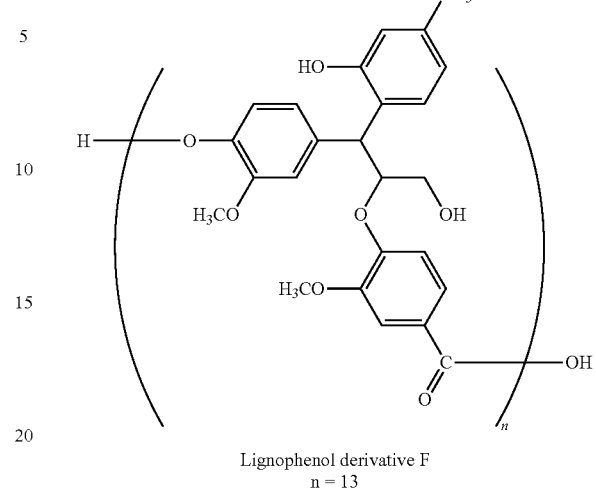

Lignophenol derivative F
n = 13

The molecular weight (Mw) and molecular weight distribution (Mw/Mn) of each lignophenol derivative are shown in the following Table 1.

TABLE 1

| Lignophenol derivative | Raw material | Molecular weight [Mw] | Molecular weight distribution [Mw/Mn] |
|---|---|---|---|
| A | Cypress | 5890 | 9.8 |
| B | Cypress | 3025 | 3.1 |
| C | Cypress | 6550 | 10.8 |
| D | Cypress | 2890 | 2.8 |
| E | Cedar | 5950 | 9.9 |
| F | Cedar | 3150 | 3.3 |

Examples 1 to 32 and Comparative Examples 1 to 6

<Preparation of Resin Composition>

A lignophenol derivative, aliphatic polyester, glass fiber, condensed phosphate ester and a flame retardant other than condensed phosphate ester are prepared in amounts shown in the following Tables 2 and 3. Among them, except for the glass fiber, the mixture of the lignophenol derivative, aliphatic polyester, condensed phosphate ester and the flame retardant other than condensed phosphate ester is kneaded at the kneading temperature shown in Tables 2 and 3 from a main hopper by a twin-screw extrusion apparatus (manufactured by Toshiba Machine Co., Ltd., TEM3000) by a method of supplying the glass fiber from a side feed hopper, cooled and pelletized to obtain a pellet type resin composition (resin pellet).

Lignophenol derivative E
n = 20

TABLE 2

| | Composition | Lignophenol derivative Kind | Lignophenol derivative Part | Aliphatic polyester Kind | Aliphatic polyester Part | Glass fiber Kind | Glass fiber Part | Condensed phosphate ester Kind | Condensed phosphate ester Part | Flame retardant other than condensed phosphate ester Kind | Flame retardant other than condensed phosphate ester Part | Kneading temperature [° C.] | Molding cylinder temperature [° C.] | Mold temperature [° C.] |
|---|---|---|---|---|---|---|---|---|---|---|---|---|---|---|
| Example | 1 A-1 | (A) | 1 part | (J) | 500 parts | (N) | 40 parts | (V) | 100 parts | — | 0 part | 180 | 170 | 30 |
| | 2 A-2 | (A) | 1 part | (J) | 100 parts | (N) | 8 parts | (V) | 20 parts | — | 0 part | 180 | 170 | 30 |
| | 3 A-3 | (A) | 1 part | (J) | 1000 parts | (N) | 80 parts | (V) | 200 parts | — | 0 part | 180 | 170 | 30 |

TABLE 2-continued

| Composition | Lignophenol derivative Kind | Part | Aliphatic polyester Kind | Part | Glass fiber Kind | Part | Condensed phosphate ester Kind | Part | Flame retardant other than condensed phosphate ester Kind | Part | Kneading temperature [° C.] | Molding cylinder temperature [° C.] | Mold temperature [° C.] |
|---|---|---|---|---|---|---|---|---|---|---|---|---|---|
| 4 A-4 | (A) | 1 part | (J) | 90 parts | (N) | 8 parts | (V) | 20 parts | — | 0 part | 180 | 170 | 30 |
| 5 A-5 | (A) | 1 part | (J) | 1100 parts | (N) | 80 parts | (V) | 200 parts | — | 0 part | 180 | 170 | 30 |
| 6 A-6 | (A) | 1 part | (J) | 500 parts | (N) | 30 parts | (V) | 100 parts | — | 0 part | 180 | 170 | 30 |
| 7 A-7 | (A) | 1 part | (J) | 500 parts | (N) | 200 parts | (V) | 100 parts | — | 0 part | 180 | 170 | 30 |
| 8 A-8 | (A) | 1 part | (J) | 500 parts | (N) | 20 parts | (V) | 100 parts | — | 0 part | 180 | 170 | 30 |
| 9 A-9 | (A) | 1 part | (J) | 500 parts | (N) | 210 parts | (V) | 100 parts | — | 0 part | 180 | 170 | 30 |
| 10 A-10 | (A) | 1 part | (J) | 500 parts | (N) | 40 parts | (V) | 300 parts | — | 0 part | 180 | 170 | 30 |
| 11 A-11 | (A) | 1 part | (J) | 500 parts | (N) | 40 parts | (V) | 15 parts | — | 0 part | 180 | 170 | 30 |
| 12 A-12 | (A) | 1 part | (J) | 500 parts | (N) | 40 parts | (V) | 320 parts | — | 0 part | 180 | 170 | 30 |
| 13 A-13 | (B) | 1 part | (J) | 500 parts | (N) | 40 parts | (V) | 100 parts | — | 0 part | 180 | 170 | 30 |
| 14 A-14 | (C) | 1 part | (J) | 500 parts | (N) | 40 parts | (V) | 100 parts | — | 0 part | 180 | 170 | 30 |
| 15 A-15 | (D) | 1 part | (J) | 500 parts | (N) | 40 parts | (V) | 100 parts | — | 0 part | 180 | 170 | 30 |
| 16 A-16 | (E) | 1 part | (J) | 500 parts | (N) | 40 parts | (V) | 100 parts | — | 0 part | 180 | 170 | 30 |
| 17 A-17 | (F) | 1 part | (J) | 500 parts | (N) | 40 parts | (V) | 100 parts | — | 0 part | 180 | 170 | 30 |
| 18 A-18 | (A) | 1 part | (K) | 500 parts | (N) | 40 parts | (V) | 100 parts | — | 0 part | 170 | 160 | 30 |
| 19 A-19 | (A) | 1 part | (L) | 500 parts | (N) | 40 parts | (V) | 100 parts | — | 0 part | 160 | 160 | 60 |

TABLE 3

| | | Composition | Lignophenol derivative Kind | Part | Aliphatic polyester Kind | Part | Glass fiber Kind | Part | Condensed phosphate ester Kind | Part | Flame retardant other than condensed phosphate ester Kind | Part | Kneading temperature [° C.] | Molding cylinder temperature [° C.] | Mold temperature [° C.] |
|---|---|---|---|---|---|---|---|---|---|---|---|---|---|---|---|
| Example | 20 | A-20 | (A) | 1 part | (M) | 500 parts | (N) | 40 parts | (V) | 100 parts | — | 0 part | 170 | 160 | 60 |
| | 21 | A-21 | (A) | 1 part | (J) | 500 parts | (O) | 40 parts | (V) | 100 parts | — | 0 part | 180 | 180 | 30 |
| | 22 | A-22 | (A) | 1 part | (J) | 500 parts | (P) | 40 parts | (V) | 100 parts | — | 0 part | 180 | 180 | 30 |
| | 23 | A-23 | (A) | 1 part | (J) | 500 parts | (Q) | 40 parts | (V) | 100 parts | — | 0 part | 180 | 180 | 30 |
| | 24 | A-24 | (A) | 1 part | (J) | 500 parts | (R) | 40 parts | (V) | 100 parts | — | 0 part | 180 | 180 | 30 |
| | 25 | A-25 | (A) | 1 part | (J) | 500 parts | (S) | 40 parts | (V) | 100 parts | — | 0 part | 180 | 180 | 30 |
| | 26 | A-26 | (A) | 1 part | (J) | 500 parts | (T) | 40 parts | (V) | 100 parts | — | 0 part | 180 | 180 | 30 |
| | 27 | A-27 | (A) | 1 part | (J) | 500 parts | (U) | 40 parts | (V) | 100 parts | — | 0 part | 180 | 180 | 30 |
| | 28 | A-28 | (A) | 1 part | (J) | 500 parts | (N) | 40 parts | (W) | 100 parts | — | 0 part | 180 | 180 | 30 |
| | 29 | A-29 | (A) | 1 part | (J) | 500 parts | (N) | 40 parts | (V) | 100 parts | (X) | 60 parts | 180 | 180 | 30 |
| | 30 | A-30 | (A) | 1 part | (J) | 500 parts | (N) | 40 parts | (V) | 100 parts | (Y) | 60 parts | 180 | 180 | 30 |
| | 31 | A-31 | (A) | 1 part | (J) | 500 parts | (N) | 40 parts | (V) | 100 parts | (Z1) | 60 parts | 180 | 180 | 30 |
| | 32 | A-32 | (A) | 1 part | (J) | 500 parts | (N) | 40 parts | (V) | 100 parts | (Z2) | 60 parts | 180 | 180 | 30 |
| Comparative example | 1 | B-1 | (A) | 1 part | (J) | 500 parts | — | 0 part | — | 0 part | — | 0 part | 180 | 180 | 30 |
| | 2 | B-2 | — | 0 part | (J) | 500 parts | (N) | 40 parts | — | 0 part | — | 0 part | 180 | 180 | 30 |
| | 3 | B-3 | — | 0 part | (J) | 500 parts | — | 0 part | (V) | 100 parts | — | 0 part | 180 | 180 | 30 |
| | 4 | B-4 | (A) | 1 part | (J) | 500 parts | (N) | 40 parts | — | 0 part | — | 0 part | 180 | 180 | 30 |
| | 5 | B-5 | (A) | 1 part | (J) | 500 parts | — | 0 part | (V) | 100 part | — | 0 part | 180 | 180 | 30 |
| | 6 | B-6 | — | 0 part | (J) | 500 parts | (N) | 40 parts | (V) | 100 parts | — | 0 part | 180 | 180 | 30 |

Meanwhile, each component used in Tables 2 and 3 is described as follows.

—Aliphatic Polyester—

Aliphatic polyester J: polylactic acid (UNITIKA LTD./TERRAMAC TE2000)/weight average molecular weight 120,000

Aliphatic polyester K: polylactic acid (Mitsui, Co., Ltd./LACEA H 100)/weight average molecular weight 60,000

Aliphatic polyester L: polyhydroxy-3-butyrate (Monsant, Co., Ltd./Biopol #30)/weight average molecular weight 200,000

Aliphatic polyester M: polybutylene succinate (Showa Polymer, Co., Ltd./bionolle 3000)/weight average molecular weight 45,000

—Glass Fiber—

Glass fiber N: Nittobo, Co., Ltd. PF-E-301-S#5 (diameter 10 μm/length 0.5 mm, aspect ratio 50, silane treatment)

Glass fiber O: Nittobo, Co., Ltd. PF-E-001-S#5 (diameter 10 μm/length 0.5 mm, aspect ratio 50, no treatment)

Glass fiber P: treatment by immersing the glass fiber O in the ethyl acetate solution in which the low molecular weight polylactic acid (Toyobo, Co., Ltd./Bioechoroll) is dissolved Glass fiber Q: Nittobo, Co., Ltd. PF-E-001-S (diameter 10 μm/length 0.1 mm, aspect ratio 10, silane treatment)

Glass fiber R: Nittobo, Co., Ltd. CS3J-332-S (diameter 11 μm/length 3 mm, aspect ratio 273, silane treatment)

Glass fiber S: Nittobo, Co., Ltd. sample (diameter 5 μm/length 0.5 mm, aspect ratio 100, silane treatment)

Glass fiber T: Nittobo, Co., Ltd. sample (diameter 20 μm/length 160 μm, aspect ratio 8, silane treatment)

Glass fiber U: Nittobo, Co., Ltd. sample (diameter 19 μm/length 6 m, aspect ratio 316, silane treatment)

—Flame Retardant—

Condensed phosphate ester V: DAIHACHI Chemical Industry, Co., Ltd./PX200

Condensed phosphate ester W: ADEKA, Co., Ltd./FP2200

Aluminum oxide X: Waco Pure Chemical Industries, Ltd./reagent: aluminum oxide

Aluminum hydroxide Y: Nippon Keikinzoku, Co., Ltd./B103T

Magnesium hydroxide Z1: Kamishima Chemical Industry, Co., Ltd./Magciz N-4

Melamine sulfate Z2: SANWA Chemical, Co., Ltd./API-NONE 901

<Manufacture of Resin Molded Product>

The resin pellet is manufactured into an ISO multi-purpose dumbbell test specimen (length 100 mm, width 10 mm and thickness 4 mm of test part) and a UL test specimen (length 125 mm, width 13 mm and thickness 0.5 mm, 1.6 mm) at the cylinder temperature and mold temperate shown in Tables 2 and 3 by using an injection molding machine (manufactured by Nissei Plastic Industrial Co., Ltd., NEX150).

[Evaluation Test]

—Mechanical Strength—

The ISO multi-purpose dumbbell test specimen is processed, and Charpy notched impact strength is measured in accordance with ISO 179-1 and, bending strain at break is measured in accordance with ISO178, by using an impact resistance test apparatus (DG-5, manufactured by Toyo Electric, Co., Ltd.).

—UL-V Test—

A UL test specimen for V test (thickness 0.5 mm and 1.6 mm) is used to perform UL-V test by the method of UL-94. The UL-V test criteria are as follows.

V-0: The flame retardancy is the highest level.
V-1: The flame retardancy is the highest after V-0
V-2: The flame retardancy is the highest after V-1
V-Not: The flame retardancy is lower than V-2

Flame retardancy test 5V is performed by the following method.

A specimen for 5V test (thickness 0.5 mm, length×width=200×200 mm) is molded by injection molding, and the test specimen is supported in a horizontal position and a flame is applied to the lower surface of the specimen for five seconds. The flame application is repeated five times, and the following evaluation is obtained by a combustion behavior.

5VB: Ignition by drops is not shown from the test specimen for 5V test.

Below 5V: Ignition by drops is shown from the test specimen for 5V test.

The results as described above are shown in Tables 4 and 5.

TABLE 4

|  |  | Composition | Charpy impact strength [KJ/m$^2$] | Bending strain at break [%] | Flame retardancy V 0.5 mm | Flame retardancy V 1.6 mm | Flame retardancy 5 V 0.5 mm |
|---|---|---|---|---|---|---|---|
| Example | 1 | A-1 | 5.8 | 4.8 | V-0 | V-0 | Below 5 V |
|  | 2 | A-2 | 5.2 | 4.1 | V-0 | V-0 | Below 5 V |
|  | 3 | A-3 | 5.4 | 4.4 | V-0 | V-0 | Below 5 V |
|  | 4 | A-4 | 4.9 | 3.8 | V-0 | V-0 | Below 5 V |
|  | 5 | A-5 | 4.6 | 3.7 | V-0 | V-0 | Below 5 V |
|  | 6 | A-6 | 5.0 | 6.9 | V-0 | V-0 | Below 5 V |
|  | 7 | A-7 | 7.8 | 4.0 | V-0 | V-0 | Below 5 V |
|  | 8 | A-8 | 4.5 | 6.7 | V-0 | V-0 | Below 5 V |
|  | 9 | A-9 | 7.6 | 3.6 | V-0 | V-0 | Below 5 V |
|  | 10 | A-10 | 5.6 | 6.5 | V-0 | V-0 | Below 5 V |
|  | 11 | A-11 | 5.1 | 4.4 | V-0 | V-0 | Below 5 V |
|  | 12 | A-12 | 4.0 | 6.5 | V-0 | V-0 | Below 5 V |
|  | 13 | A-13 | 6.5 | 6.8 | V-0 | V-0 | Below 5 V |
|  | 14 | A-14 | 4.0 | 4.0 | V-0 | V-0 | Below 5 V |
|  | 15 | A-15 | 4.8 | 3.9 | V-0 | V-0 | Below 5 V |
|  | 16 | A-16 | 5.8 | 4.7 | V-0 | V-0 | Below 5 V |
|  | 17 | A-17 | 6.4 | 6.7 | V-0 | V-0 | Below 5 V |
|  | 18 | A-18 | 6.0 | 5.2 | V-0 | V-0 | Below 5 V |
|  | 19 | A-19 | 4.5 | 4.0 | V-0 | V-0 | Below 5 V |

TABLE 5

|  |  | Composition | Charpy impact strength [KJ/m$^2$] | Bending strain at break [%] | Flame retardancy V 0.5 mm | Flame retardancy V 1.6 mm | Flame retardancy 5 V 0.5 mm |
|---|---|---|---|---|---|---|---|
| Example | 20 | A-20 | 5.6 | 6.5 | V-0 | V-0 | Below 5 V |
|  | 21 | A-21 | 4.8 | 4.4 | V-0 | V-0 | Below 5 V |
|  | 22 | A-22 | 6.0 | 4.8 | V-0 | V-0 | Below 5 V |
|  | 23 | A-23 | 5.0 | 5.0 | V-0 | V-0 | Below 5 V |
|  | 24 | A-24 | 6.9 | 3.9 | V-0 | V-0 | Below 5 V |
|  | 25 | A-25 | 6.0 | 4.4 | V-0 | V-0 | Below 5 V |
|  | 26 | A-26 | 4.0 | 5.0 | V-0 | V-0 | Below 5 V |
|  | 27 | A-27 | 6.7 | 3.7 | V-0 | V-0 | Below 5 V |

TABLE 5-continued

|  |  | Composition | Charpy impact strength [KJ/m$^2$] | Bending strain at break [%] | Flame retardancy V 0.5 mm | Flame retardancy V 1.6 mm | Flame retardancy 5 V 0.5 mm |
|---|---|---|---|---|---|---|---|
|  | 28 | A-28 | 5.1 | 5.4 | V-0 | V-0 | Below 5 V |
|  | 29 | A-29 | 4.2 | 4.2 | V-0 | V-0 | 5VB |
|  | 30 | A-30 | 4.0 | 4.1 | V-0 | V-0 | 5VB |
|  | 31 | A-31 | 3.9 | 3.8 | V-0 | V-0 | Below 5 V |
|  | 32 | A-32 | 4.0 | 4.2 | V-0 | V-0 | Below 5 V |
| Comparative Example | 1 | B-1 | 5.5 | 6.8 | V-Not | V-2 | Below 5 V |
|  | 2 | B-2 | 5.8 | 0.2 | V-Not | V-Not | Below 5 V |
|  | 3 | B-3 | 2.4 | 2.6 | V-Not | V-2 | Below 5 V |
|  | 4 | B-4 | 6.2 | 0.7 | V-Not | V-Not | Below 5 V |
|  | 5 | B-5 | 7.8 | 10.0 | V-1 | V-0 | Below 5 V |
|  | 6 | B-6 | 5.2 | 3.1 | V-Not | V-Not | Below 5 V |

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and there equivalents.

What is claimed is:

1. A resin composition comprising:

a crosslinked polymer compound having a crosslinked structure formed by reaction of (a) a carboxyl group of aliphatic polyester having at least a carboxyl group at an end of polymer chain with (b) a hydroxyl group of a lignophenol derivative having at least a hydroxyl group and a ratio of a weight average molecular weight to a number average molecular weight of from 3 to 10, a glass fiber, and condensed phosphate ester.

2. The resin composition according to claim 1, wherein in the crosslinked polymer compound, a mass ratio of a content of a component derived from the lignophenol derivative to a content of a component derived from aliphatic polyester is from 0.1% by mass to 1% by mass.

3. The resin composition according to claim 1, further comprising:

aluminum hydroxide.

4. The resin composition according to claim 1, wherein the lignophenol derivative is represented by formula (1):

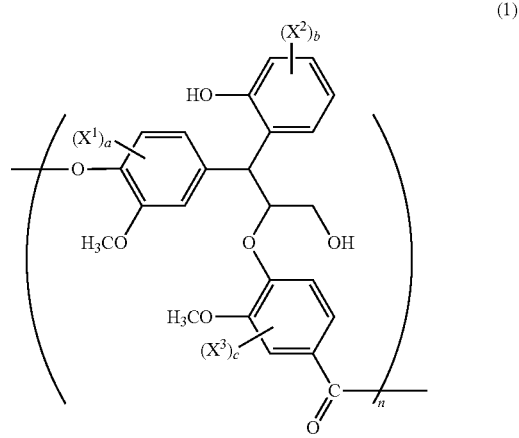

wherein each of $X^1$, $X^2$ and $X^3$ independently represents a substituted or unsubstituted alkyl group, a substituted or unsubstituted alkoxy group, a substituted or unsubstituted aryl group, a substituted or unsubstituted arylene group, a hydroxyl group, a carboxyl group, an amino group or an amide group, each of a and c independently represents an integer of from 0 to 3, b represents an integer of from 0 to 4, and n represents an integer of from 5 to 20.

5. The resin composition according to claim 1, wherein the lignophenol derivative is represented by one selected from the group consisting of Formula (2), Formula (3) and Formula (4):

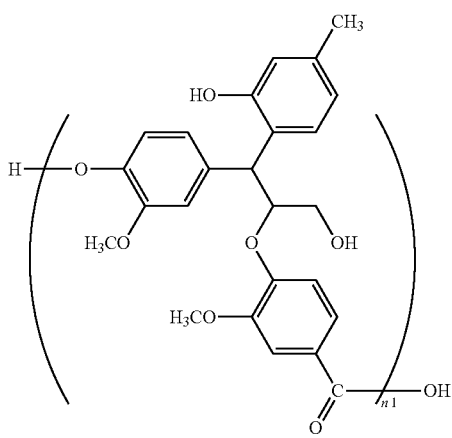

(2)

wherein n1 represents an integer of from 5 to 20:

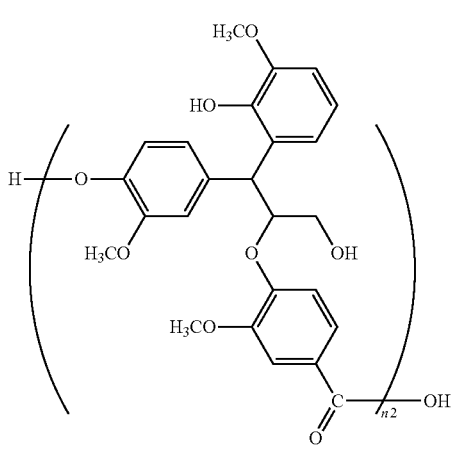

(3)

wherein n2 represents an integer of from 5 to 20:

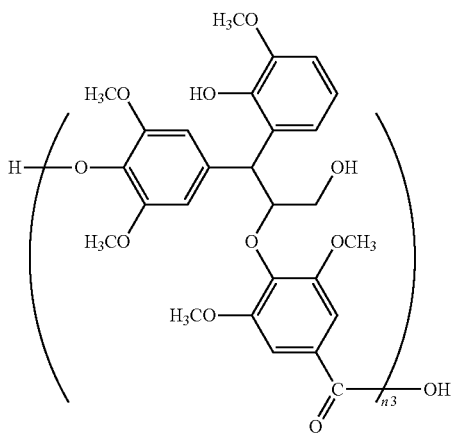

(4)

wherein n3 represents an integer of from 5 to 20.

6. The resin composition according to claim 1, wherein the condensed phosphate ester is present in an amount of from 5% by mass to 30% by mass based on a total amount of the resin composition.

7. A resin composition comprising:
a crosslinked polymer compound having a crosslinked structure formed by reaction of (a) a carboxyl group of aliphatic polyester having at least a carboxyl group at an end of polymer chain with (b) a hydroxyl group of a lignophenol derivative having at least a hydroxyl group,
a glass fiber,
condensed phosphate ester, and
aluminum hydroxide,
wherein the aluminum hydroxide is present in an amount of from 5% by mass to 30% by mass based on a total amount of the resin composition.

8. A resin composition comprising:
a crosslinked polymer compound having a crosslinked structure formed by reaction of (a) a carboxyl group of aliphatic polyester having at least a carboxyl group at an end of polymer chain with (b) a hydroxyl group of a lignophenol derivative having at least a hydroxyl group,
a glass fiber,
condensed phosphate ester, and
aluminum hydroxide,
wherein a mass ratio of the aluminum hydroxide and the condensed phosphate ester is from 6:1 to 1:1.

9. The resin composition according to claim 1, wherein a fiber length of the glass fiber is from 0.1 mm to 6 mm, and
a fiber diameter of the glass fiber is 5 μm to 20 μm.

10. The resin composition according to claim 1, wherein the glass fiber is present in an amount of from 7% by mass to 30% by mass based on a total amount of the resin composition.

11. A resin molded product comprising the resin composition according to claim 1.

12. The resin molded product according to claim 11, wherein in the crosslinked polymer compound, a mass ratio of a content of a component derived from the lignophenol derivative to a content of a component derived from aliphatic polyester is from 0.1% by mass to 1% by mass.

13. The resin molded product according to claim 11, further comprising:
aluminum hydroxide.

14. The resin molded product according to claim 11, wherein the condensed phosphate ester is present in an amount of from 1 part by mass to 30 parts by mass with respect to 100 parts by mass of the resin molded product.

15. The resin molded product according to claim 11, wherein the condensed phosphate ester is present an amount of from 5% by mass to 30% by mass based on a total amount of the resin composition.

16. The resin molded product according to claim 13, wherein the aluminum hydroxide is present in an amount of from 5% by mass to 30% by mass based on a total amount of the resin composition.

17. The resin molded product according to claim 13, wherein a mass ratio of the aluminum hydroxide and the condensed phosphate ester is from 6:1 to 1:1.

18. A resin molded product comprising the resin composition according to claim 7.

19. A resin molded product comprising the resin composition according to claim 8.

* * * * *